US012567541B2

(12) United States Patent
  Ookawa

(10) Patent No.: US 12,567,541 B2
(45) Date of Patent: Mar. 3, 2026

(54) ELECTRONIC COMPONENT AND METHOD FOR MANUFACTURING ELECTRONIC COMPONENT

(71) Applicant: Murata Manufacturing Co., Ltd., Nagaokakyo (JP)

(72) Inventor: Noriyuki Ookawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 105 days.

(21) Appl. No.: 18/612,190

(22) Filed: Mar. 21, 2024

(65) Prior Publication Data

US 2024/0234036 A1     Jul. 11, 2024

Related U.S. Application Data

(63) Continuation of application No. PCT/JP2023/027678, filed on Jul. 28, 2023.

(30) Foreign Application Priority Data

Aug. 8, 2022     (JP) ................................. 2022-126338

(51) Int. Cl.
  *H01G 4/30*         (2006.01)
  *H01G 4/012*       (2006.01)
  *H01G 4/232*       (2006.01)
(52) U.S. Cl.
  CPC ............... *H01G 4/30* (2013.01); *H01G 4/012* (2013.01); *H01G 4/232* (2013.01)
(58) Field of Classification Search
  CPC ........... H01G 4/30; H01G 4/012; H01G 4/232
  See application file for complete search history.

(56) References Cited

U.S. PATENT DOCUMENTS

| | | | |
|---|---|---|---|
| 10,453,608 B2 | 10/2019 | Kobayashi | |
| 11,302,480 B2 | 4/2022 | Takahashi et al. | |
| 11,810,725 B2 | 11/2023 | Kitahara et al. | |
| 2010/0202098 A1 | 8/2010 | Yanagida et al. | |
| 2017/0365413 A1* | 12/2017 | Kurokawa ........... | H01F 27/292 |
| 2018/0068788 A1* | 3/2018 | Kobayashi .......... | C23C 18/1279 |
| 2019/0304683 A1* | 10/2019 | Terashita ............... | H01G 4/228 |
| 2020/0135403 A1* | 4/2020 | Lee .......................... | H01G 4/12 |

(Continued)

FOREIGN PATENT DOCUMENTS

| | | |
|---|---|---|
| JP | 5206440 B2 | 6/2013 |
| JP | 2021-019123 A | 2/2021 |

(Continued)

OTHER PUBLICATIONS

International Search Report received for PCT Patent Application No. PCT/JP2023/027678, mailed on Sep. 12, 2023, 2 pages. (English Translation Only).

*Primary Examiner* — Michael P Mcfadden
(74) *Attorney, Agent, or Firm* — ArentFox Schiff LLP

(57) ABSTRACT

An electronic component that includes: a base body; and an external electrode that covers a part of an outer surface of the base body, the external electrode including: an underlying electrode containing copper and silicon; and a metal layer that covers an outer surface of the underlying electrode, wherein at least some of the copper has copper particles with a flattening ratio of 0.5 or less, and when the underlying electrode is viewed in section, the silicon is distributed so as to fill gaps between the copper particles.

18 Claims, 4 Drawing Sheets

(56)  References Cited

U.S. PATENT DOCUMENTS

| 2021/0027945 | A1 | 1/2021 | Takahashi et al. | |
| 2022/0102078 | A1 | 3/2022 | Kitahara et al. | |
| 2022/0208463 | A1* | 6/2022 | Hoshino | ............... H01G 4/232 |
| 2024/0029958 | A1 | 1/2024 | Kitahara et al. | |

FOREIGN PATENT DOCUMENTS

| JP | 2022-057923 | A | 4/2022 |
| WO | 2016/186053 | A1 | 11/2016 |

* cited by examiner

ELECTRONIC COMPONENT AND METHOD FOR MANUFACTURING ELECTRONIC COMPONENT

CROSS REFERENCE TO RELATED APPLICATIONS

The present application is a continuation of International application No. PCT/JP2023/027678, filed Jul. 28, 2023, which claims priority to Japanese Patent Application No. 2022-126338, filed Aug. 8, 2022, the entire contents of each of which are incorporated herein by reference.

TECHNICAL FIELD

The present invention relates to an electronic component and a method for manufacturing an electronic component.

BACKGROUND ART

The electronic component described in Patent Document 1 includes a base body, an internal electrode, and an external electrode. The internal electrode is located inside the base body. The external electrode has an underlying electrode and a metal layer. The underlying electrode covers a part of the outer surface of the base body. The metal layer covers the outer surface of the underlying electrode.

Patent Document 1: Japanese Patent No. 5206440

SUMMARY OF THE INVENTION

In the electronic component described in Patent Document 1, for forming the metal layer, a plating solution is applied to the outer surface of the underlying electrode. In this case, the plating solution may penetrate into the underlying electrode. The penetration of the plating solution into the underlying electrode will cause the underlying electrode and the metal layer to be peeled off, which is not preferred.

For solving the problem mentioned above, an aspect of the present disclosure is an electronic component including: a base body; and an external electrode that covers a part of an outer surface of the base body, the external electrode comprising: an underlying electrode containing copper and silicon; and a metal layer that covers an outer surface of the underlying electrode, wherein at least some of the copper has copper particles with a flattening ratio of 0.5 or less, and when the underlying electrode is viewed in section, the silicon is distributed so as to fill a gap between the copper particles.

In accordance with the configuration mentioned above, the silicon is distributed without any gap around the copper particles in the underlying electrode. More specifically, the underlying electrode is a dense film that is high in density. Accordingly, in accordance with the configuration mentioned above, for example, a plating solution or the like for forming the metal layer can be kept from penetrating into the underlying electrode.

In addition, For solving the problem mentioned above, the present invention provides a method for manufacturing an electronic component, including: preparing a base body; applying a conductor paste containing a copper component and a silicon component to an outer surface of the base body; heating the base body with the conductor paste applied to convert the conductor paste to an underlying electrode; and immersing the base body with the underlying electrode formed thereon in a plating solution to form a metal layer on the outer surface of the underlying electrode, where a curing onset temperature of the silicon component is higher than a sintering onset temperature of the copper component, and a difference between the curing onset temperature of the silicon component and the sintering onset temperature of the copper component is 100 degrees or less.

In accordance with the configuration mentioned above, the copper component is started to be sintered in the conductor paste before the silicon component is started to be cured therein. Due to this difference in onset temperature, the gaps between the copper particle components are filled with the silicon component. Accordingly, in the sintered electronic component, the silicon is distributed without any gap around the copper particles in the underlying electrode. More specifically, the underlying electrode is a dense film that is high in density. Accordingly, in accordance with the configuration mentioned above, for example, a plating solution or the like for forming the metal layer can be kept from penetrating into the underlying electrode.

The metal layer is kept from penetrating into the underlying electrode.

DETAILED DESCRIPTION OF THE INVENTION

Embodiment of Electronic Component

Hereinafter, an embodiment of an electronic component will be described with reference to the drawings. It is to be noted that the drawings may show enlarged components for the sake of easy understanding. The dimensional ratios of the components may be different from the actual ones or those in another drawing.

Electronic Component

Figure 1:
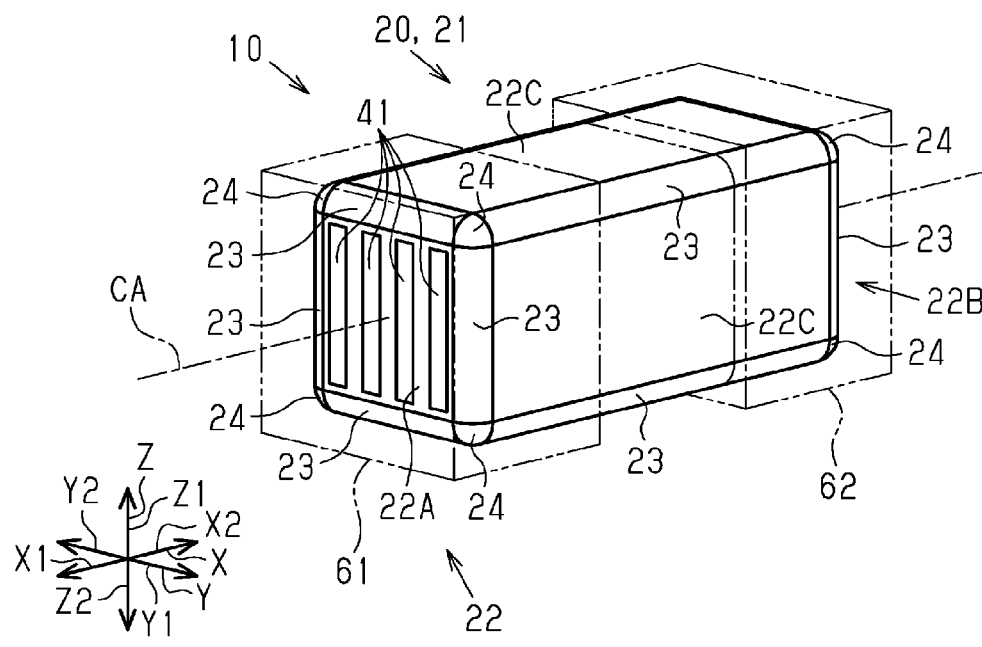
FIG. 1 is a perspective view of an electronic component.

As shown in FIG. 1, the electronic component 10 is a multilayer ceramic capacitor. The electronic component 10 includes a base body 20. The base body 20 has a substantially quadrangular columnar shape and has a central axis CA. Hereinafter, an axis extending along the central axis CA is defined as a first axis X. In addition, one of axes that are orthogonal to the first axis X is defined as a second axis Y. Further, an axis that is orthogonal to both the first axis X and the second axis Y is defined as a third axis Z. In addition, one of the directions along the first axis X is defined as a first positive direction X1, and the direction opposite to the first positive direction X1, of the directions along the first axis X, is defined as a first negative direction X2. In addition, one of the directions along the second axis Y is defined as a second positive direction Y1, and the direction opposite to the second positive direction Y1, of the directions along the second axis Y, is defined as a second negative direction Y2. Furthermore, one of the directions along the third axis Z is defined as a third positive direction Z1, and the direction opposite to the third positive direction Z1, of the directions along the third axis Z, is defined as a third negative direction Z2.

An outer surface 21 of the base body 20 has six flat faces 22. It is to be noted that the term "face" of the base body 20 as used herein refers to a part that can be observed as a face when the whole base body 20 is observed. More specifically, for example, if there are such minute irregularities or steps that fail to be found unless a part of the base body 20 is enlarged and then observed with a microscope or the like, the face is expressed as a flat face or a curved face. The six flat faces 22 face in different directions. The six flat faces 22 are roughly divided into a first end surface 22A that faces in the first positive direction X1, a second end surface 22B that has in the first negative direction X2, and four side surfaces 22C. The four side surfaces 22C are respectively a surface that faces in the third positive direction Z1, a surface that faces in the third negative direction Z2, a surface that faces in the second positive direction Y1, and a surface that faces in the second negative direction Y2.

The outer surface 21 of the base body 20 has twelve boundary surfaces 23. The boundary surface 23 includes a curved surface that is present at the boundary between the adjacent flat faces 22. More specifically, the boundary surface 23 includes, for example, a curved surface formed by round chamfering of a corner formed by the adjacent flat faces 22.

In addition, the outer surface 21 of the base body 20 has eight spherical corner surfaces 24. The corner surface 24 is a boundary part between the three adjacent flat faces 22. In other words, the corner surface 24 includes a curved surface at a position where the three boundary surfaces 23 intersect. More specifically, the corner surface 24 includes, for example, a curved surface formed by round chamfering of a corner formed by the three adjacent flat faces 22.

Figure 2:
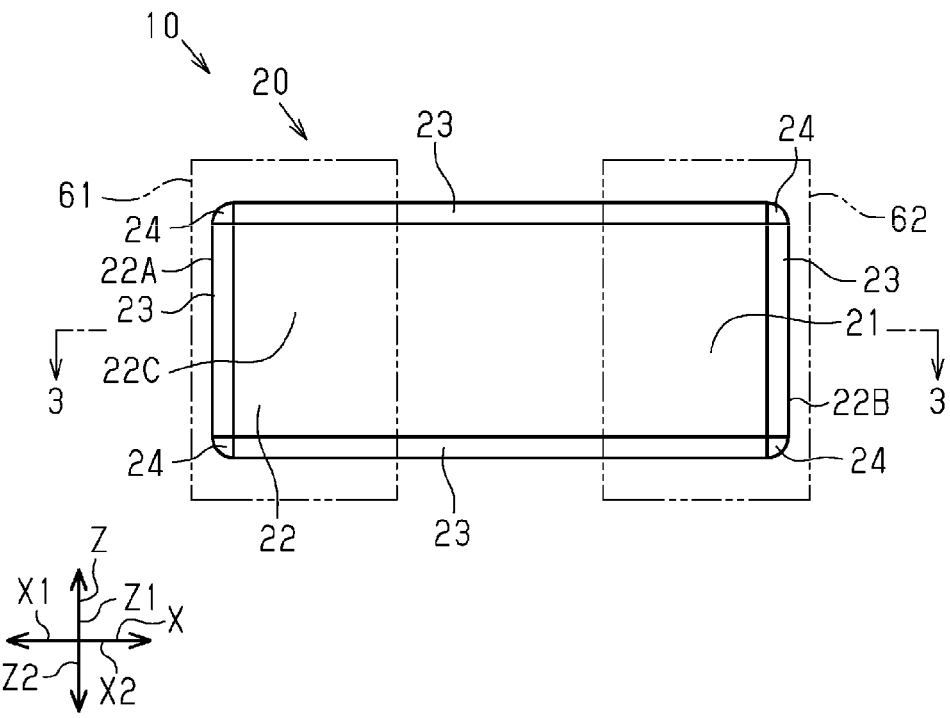
FIG. 2 is a side view of the electronic component.

As shown in FIG. 2, the base body 20 is larger in dimension in the direction along the first axis X than in dimension in the direction along the third axis Z. The material of the base body 20 is a dielectric ceramic. Specifically, the material of the base body 20 contains $BaTiO_3$ as a main component. Alternatively, the material of the base body 20 may contain $CaTiO_3$, $SrTiO_3$, $CaZrO_3$, or the like as a main component. In addition, the material of the base body 20 may contain a Mn compound, a Co compound, a Si compound, a rare earth compound, or the like as an accessory component.

Figure 3:
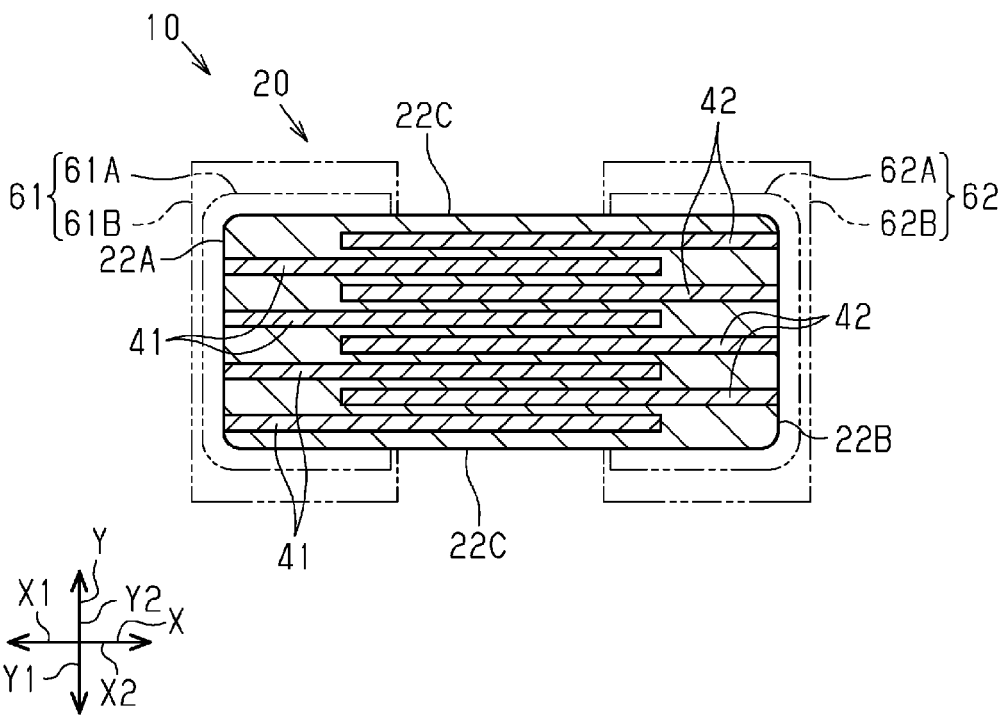
FIG. 3 is a sectional view taken along line 3-3 in FIG. 2.

As shown in FIG. 3, the electronic component 10 includes four first internal electrodes 41 and four second internal electrodes 42 as wiring. The first internal electrodes 41 and the second internal electrodes 42 are embedded in the base body 20.

The material of the first internal electrodes 41 is a conductive material. For example, the material of the first internal electrodes 41 is Ni. In addition, the material of the first internal electrode 41 may further contain metals such as Ni, Cu, Ag, Au, Pt, Sn, and Pd, or alloys containing these metals. The material of the second internal electrodes 42 is the same as the material of the first internal electrodes 41.

The first internal electrode 41 has a rectangular plate shape. A main surface of the first internal electrode 41 is orthogonal to the second axis Y. The second internal electrode 42 has the same rectangular plate shape as the first internal electrode 41. A main surface of the second internal electrode 42 is orthogonal to the second axis Y, as with the first internal electrode 41.

The dimension of the first internal electrode 41 in the direction along the first axis X is smaller than the dimension of the base body 20 in the direction along the first axis X. In addition, as shown in FIG. 1, the dimension of the first internal electrode 41 in the direction along the third axis Z is approximately ⅔ of the dimension of the base body 20 in the direction along the third axis Z. The dimensions of the second internal electrode 42 in each of the directions are the same as those of the first internal electrode 41.

As shown in FIG. 3, the first internal electrodes 41 and the second internal electrodes 42 are located in a staggered manner in the direction along the second axis Y. More specifically, the eight internal electrodes in total are arranged alternately in the order of the first internal electrode 41 and the second internal electrode 42 toward the second negative direction Y2 from the side surface 22C that faces in the second positive direction Y1. According to this embodiment, the distances between the respective internal electrodes in the direction along the second axis Y are equal to each other.

As shown in FIG. 1, the four first internal electrodes 41 and the four second internal electrodes 42 are both located at the center of the base body 20 in the direction along the third axis Z. In contrast, as shown in FIG. 3, the first internal electrodes 41 are located to be shifted in the first positive direction X1. The second internal electrodes 42 are located to be shifted in the first negative direction X2.

Specifically, an end of the first internal electrode 41 in the first positive direction X1 coincides with an end of the base body 20 in the first positive direction X1. The end of the first internal electrode 41 in the first negative direction X2 is located inside the base body 20, and does not reach the end of the base body 20 in the first negative direction X2. In contrast, an end of the second internal electrode 42 in the first negative direction X2 coincides with the end of the base body 20 in the first negative direction X2. The end of the second internal electrode 42 in the first positive direction X1 is located inside the base body 20, without reaching the end of the base body 20 in the first positive direction X1.

As shown in FIG. 3, the electronic component 10 includes a first external electrode 61 and a second external electrode 62. The first external electrode 61 includes a first underlying electrode 61A and a first metal layer 61B. The first underlying electrode 61A is stacked at a part of the outer surface 21 of the base body 20, including the first end surface 22A.

The first underlying electrode 61A is a five-face electrode that covers the first end surface 22A of the base body 20 and parts of the four side surfaces 22C thereof in the first positive direction X1. According to this embodiment, the material of the first underlying electrode 61A is copper and glass. In addition, the first underlying electrode 61A is a sintered body.

As shown in FIG. 3, the first metal layer 61B covers the first underlying electrode 61A from the outside. Thus, the first metal layer 61B is stacked on the first underlying electrode 61A. In addition, a part of the first metal layer 61B is protruded from the first underlying electrode 61A. Although not shown in the drawing, the first metal layer 61B has a two-layer structure of a nickel layer and a tin layer in this order from the first underlying electrode 61A. It is to be noted that the first metal layer 61B does not penetrate into the first underlying electrode 61A.

The second external electrode 62 includes a second underlying electrode 62A and a second metal layer 62B. The second underlying electrode 62A is stacked at a part of the outer surface 21 of the base body 20, including the second end surface 22B.

The second underlying electrode 62A is a five-face electrode that covers the second end surface 22B of the base body 20 and parts of the four side surfaces 22C thereof in the first negative direction X2. According to this embodiment, the material of the second underlying electrode 62A is the same as the material of the first external electrode 61, and is copper and glass. In addition, as with the first underlying electrode 61A, the second underlying electrode 62A is a sintered body.

The second metal layer 62B covers the second underlying electrode 62A from the outside. Thus, the second metal layer 62B is stacked on the second underlying electrode 62A. In addition, a part of the second metal layer 62B is protruded from the second underlying electrode 62A. Although not shown in the drawing, the second metal layer 62B has, as with the first metal layer 61B, a two-layer structure of a nickel layer and a tin layer in this order from the second underlying electrode 62A. It is to be noted that the second metal layer 62B does not penetrate into the second underlying electrode 62A.

The second external electrode 62 is, without reaching the first external electrode 61 on the side surface 22C, disposed away from the first external electrode 61 in the direction along the first axis X. On the side surface 22C of the base body 20, the first external electrode 61 and the second external electrode 62 are not stacked in a central portion in the direction along the first axis X. It is to be noted that the first external electrode 61 and the second external electrode 62 are indicated by two-dot chain lines in FIGS. 1 to 3.

Configurations of First Underlying Electrode and Second Underlying Electrode

The first underlying electrode 61A contains copper and silicon. In addition, the first underlying electrode 61A is a sintered body. While the first underlying electrode 61A will be representatively described below, the same applies to the second underlying electrode 62A.

Figure 4:
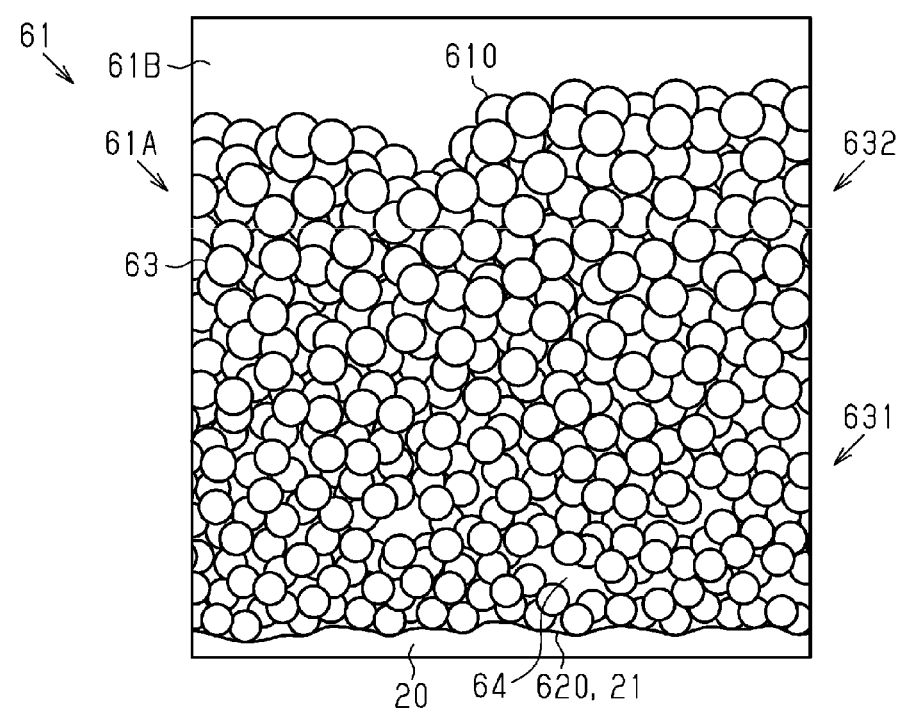
FIG. 4 is an enlarged view of a section of a first underlying electrode of the electronic component.

The ratio by weight of copper to silicon in the first underlying electrode 61A is 0.5 to 2. As shown in FIG. 4, at least a part of the copper in the first underlying electrode 61A has copper particles 63. In addition, the silicon in the first underlying electrode 61A is present as a silicone resin 64. It is to be noted that the silicone resin 64 is a polymer composed of a siloxane bond and a Si—C bond.

Figure 6:
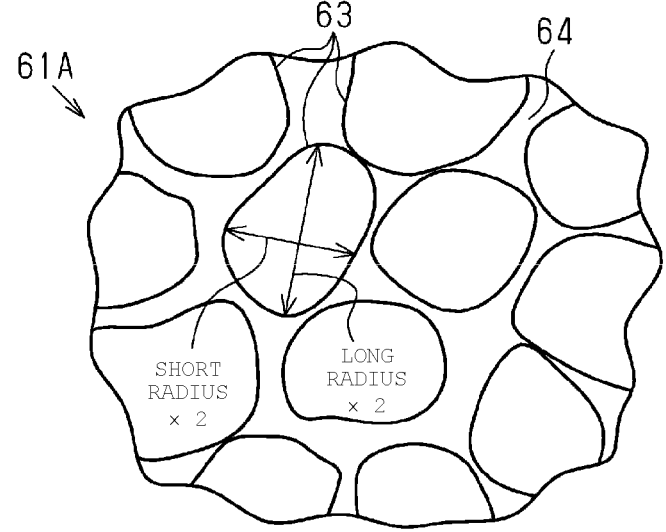
FIG. 6 is an enlarged schematic view of an outer surface of the first underlying electrode in the electronic component.

The flattening ratio F of the copper particles 63 is 0.5 or less. Accordingly, the copper particles 63 have a substantially spherical appearance. Further, the flattening ratio F is calculated as follows. First, as shown in FIG. 6, the outlines of the copper particles 63 are acquired by image processing with a scanning transmission electron microscope (STEM). The images are acquired with, for example, a scanning transmission electron microscope adjusted to a magnification of 200,000 times or more. The parameters for photographing were set such that: the acceleration voltage was 200 kV; and the focusing lens aperture was #3. Platinum sputter coating was performed as a pretreatment for photographing. The images acquired under this condition are analyzed, and the half length of the longest line segment among line segments connecting edges of one of the copper particle 63 is defined as a long radius a. In addition, half the length of the line segment orthogonal to the long radius a and connecting the edges of the copper particle 63 is defined as a short radius b. In this case, the flattening ratio F is calculated based on the following equation: (Formula 1) $F=1-(b/a)$ Then, the flattening ratios F of five particles are similarly calculated with the use of the formula 1, and the average of the flattening ratios F of the five particles is defined as the flattening ratio F for all of the copper particles 63.

As shown in FIG. 4, in this regard, the first underlying electrode 61A is bisected into a first part 631 on the side closer to an inner surface 620 of the first underlying electrode 61A and a second part 632 on the side closer to an outer surface 610 of the first underlying electrode 61A. It is to be noted that the inner surface 620 is a boundary surface of the first underlying electrode 61A on the side closer to the base body 20. The outer surface 610 is an outer surface of the first underlying electrode 61A on the side opposite to the base body 20. It is to be noted that the position where the first underlying electrode 61A is bisected is a site where the average value of the thickness H of the first underlying electrode 61A is bisected.

As shown in FIG. 4, the average value of the particle sizes of the copper particles 63 is different between the first part 631 and the second part 632. Specifically, the average value of the particle sizes of the copper particles 63 in the first part 631 is smaller than the average value of the particle sizes of the copper particles 63 in the second part 632. More specifically, the particle sizes of most of the copper particles 63 located in the first part 631 are smaller than the particle sizes of the copper particles 63 located in the second part 632. Further, as a whole, the particle sizes of the copper particles 63 are decreased toward the inner surface 620 in the first underlying electrode 61A.

The particle size of the copper particle 63 has a length that is twice the average of the long radius a and the short radius b. Further, the average value of the particle sizes of the copper particles 63 in the first part 631 is defined as the average value of the particle sizes of five of the copper particles 63 located in the first part 631. The average value of the particle sizes of the copper particles 63 in the second part 632 is defined as the average value of the particle sizes of five of the copper particles 63 located in the second part 632.

Figure 5:
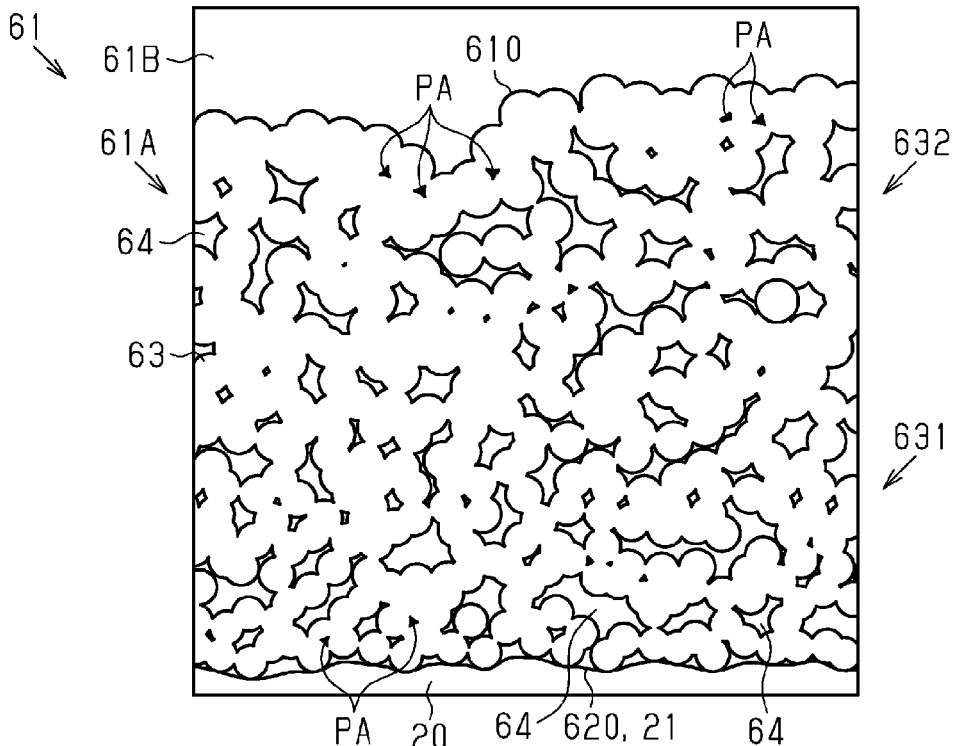
FIG. 5 is an enlarged view of a section of the first underlying electrode of the electronic component.

As shown in FIG. 5, the silicone resin 64 as silicon is distributed in a network form. Specifically, when the first underlying electrode 61A is viewed in section, the silicone resin 64 is distributed so as to fill the gaps between the multiple copper particles 63. According to this embodiment, the silicone resin 64 is distributed in a network form in such a manner that reflects the multiple copper particles 63 substantially in point contact with each other. In addition, a part of the silicone resin 64 has a lump form. The silicone resin 64 in the lump form is a condensed part of the silicone resin 64 in the network form. In particular, the first part 631 is higher than the second part 632 in the proportion of the silicone resin 64 in the lump form.

The proportion of the silicone resin 64 in the first part 631 of the first underlying electrode 61A is higher than the proportion of the silicone resin 64 in the second part 632 of the first underlying electrode 61A. It is to be noted that the proportion of the silicone resin 64 is calculated as follows. First, a section of the first underlying electrode 61A is photographed with a scanning electron microscope (SEM-EDX). The image is acquired with, for example, a scanning electron microscope adjusted to a magnification of 200,000 times or more. The parameters for photographing were set such that: the spot diameter was 5; the time constant was Rate1; and the cumulative number was 100. Next, for the photographed image, the area occupied by the silicone resin 64 within a certain square range is calculated. Then, the area of the silicone resin 64 with respect to the area of the square is defined as the proportion of the silicone resin 64. In this case, the square range is determined so as not to protrude from the first part 631, and the proportion of the silicone resin 64 is calculated. Then, the proportion of the silicone resin 64 is calculated at three or more points within the range of the first part 631, and the average value thereof is defined as the proportion of the silicone resin 64 in the first part 631. It is to be toted that the same applies to the second part 632.

When the shortest distance from the inner surface 620 to the outer surface 610 in the first underlying electrode 61A is defined as the thickness H, the average value for the thickness H of the first underlying electrode 61A is 700 nm. It is to be noted that the thickness H of the first underlying electrode 61A is calculated as follows. First, a section including the outer surface 610 and inner surface 620 of the first underlying electrode 61A is photographed with a scanning transmission electron microscope. The parameters for photographing are the same as the conditions for the above-mentioned photographing with the use of the scanning transmission electron microscope. Next, a range in a direction along the outer surface 610 of the first underlying electrode 61A is specified for the photographed image. In this range, the sectional area of the first underlying electrode 61A is calculated by image processing for a measurement range of at least 5 μm or more. Then, the calculated sectional area of the first underlying electrode 61A in the measurement range is divided by the length, which is the measurement range, to calculate the thickness H of the first underlying electrode 61A. More specifically, the thickness H of the first underlying electrode 61A is the thickness in the measurement range.

As shown in FIG. 5, the first underlying electrode 61A has voids PA without any synthetic resin such as a silicone resin 64 between the copper particles 63. The proportion of the voids PA in the first underlying electrode 61A is less than 5%. As described above, when the proportion of the voids PA in the first underlying electrode 61A is less than 5%, the silicone resin 64 can be considered distributed so as to fill the voids between the copper particles 63. It is to be noted that the voids PA are schematically illustrated in FIG. 5.

The porosity measured as follows is used for the proportion of the voids PA in the first underlying electrode 61A. First, in a scanning transmission electron microscope, the first underlying electrode 61A is observed in a square range of 500 nm on a side at a magnification of 200,000 times or more. In the range, the total area of sites without the copper particles 63 or the silicone resin 64, that is, the voids PA is calculated by image processing. Then, the porosity is calculated from the ratio of the total area of the voids PA to the area of the observation range. This process is repeated at four sites of the first underlying electrode 61A, and the average value of the porosities in the respective ranges is defined as the proportion of the voids PA in the first underlying electrode 61A.

Method for Manufacturing Electronic Component

Next, a method for manufacturing the electronic component 10 will be described.

Figure 8:
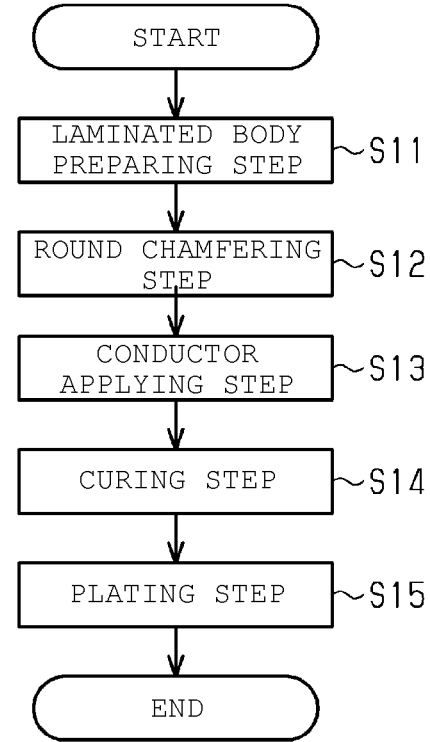
FIG. 8 is a flowchart illustrating a method for manufacturing an electronic component.

As shown in FIG. 8, the method for manufacturing the electronic component 10 further includes a laminated body preparing step S11, a round chamfering step S12, a conductor applying step S13, a curing step S14, and a plating step S15.

First, for forming the base body 20, a laminated body that is the base body 20 without the boundary surfaces 23 or the corner surfaces 24 is prepared in the laminated body preparing step S11. More specifically, the laminated body, which is subjected to no round chamfering, has a rectangular parallelepiped shape with the six flat faces 22. For example, first, a plurality of ceramic sheets to serve as the base body 20 are prepared. The sheets each has a thin plate shape. On the sheet, a conductive paste to serve as the first internal electrode 41 is stacked. On the laminated paste, the ceramic sheet to serve as the base body 20 is stacked. On the sheet, a conductive paste to serve as the second internal electrode 42 is stacked. In this manner, the ceramic sheet and the conductive paste are stacked. Then, the stacked sheets are subjected to pressure bonding in the stacking direction by means such as die pressing. Thereafter, the sheets subjected to the pressure bonding are cut into a predetermined size to form an unfired laminated body. Thereafter, the unfired stacked body is subjected to firing at a high temperature to provide a laminated body.

Next, the round chamfering step S12 is performed. In the round chamfering step S12, the boundary surfaces 23 and the corner surfaces 24 are formed for the laminated body prepared in the laminated body preparing step S11. For example, the corners of the laminated body is subjected to round chamfering by barrel polishing to form the boundary surfaces 23 with curved surfaces and the corner surfaces 24 with curved surfaces.

Next, the conductor applying step S13 is performed. In the conductor applying step S13, a conductor paste is applied to two parts of: a part of the first end surface 22A of the base body 20; and a part of the second end surface 22B of the base body 20. Specifically, the conductor paste is applied so as to cover the whole region of the first end surface 22A and parts of the four side surfaces 22C. In addition, the conductor paste is applied so as to cover the whole region of the second end surface 22B and parts of the four side surfaces 22C.

Further, the conductor paste is a complex ink. In addition, the conductor paste of the complex ink is prepared as follows. First, an amine compound such as 2-ethylhexylamine and an alcoholamine such as 2-amino-2-methylpropanol are mixed. Then, a silicon component such as a silicone resin is added thereto in an amount of 10-300 wt % with respect to the weight of Cu alone. Then, a metal salt is further added thereto and dissolved to prepare the conductor paste. More specifically, the conductor paste contains a copper component and the silicon component. The sintering onset temperature of the copper component is 170 degrees, and the curing onset temperature of the silicon component is 250 degrees. How to determine the sintering onset temperature of the copper component and the curing onset temperature of the silicon component will be described later.

Next, the curing step S14 is performed. Specifically, the base body 20 with the conductor paste applied thereto is heated in the curing step S14. According to the present embodiment, the base body 20 with the conductor paste applied thereto is heated in a nitrogen atmosphere. Then, the temperature is maintained within the range from 300 degrees to 600 degrees. Thus, the conductor paste is fired. In firing the conductor paste, first, the copper component contained in the first underlying electrode 61A and the second underlying electrode 62A is started is started to be sintered. At the time when the copper component is started to be sintered, the silicon component is not cured with fluidity. Thus, the gaps of the copper component are filled with the silicon component. Then, when the temperature is further increased to the curing onset temperature of the silicon component after the copper component is started to be sintered, the silicon component contained in the first underlying electrode 61A and the second underlying electrode 62A is started to be cured. More specifically, the curing onset temperature of the silicon component is higher than the sintering onset temperature of the copper component. Then, the copper component is sintered, thereby producing the copper particles 63. In addition, the silicon component is cured, thereby producing the silicone resin 64. In addition, as described above, the curing onset temperature of the silicon component is higher than the sintering onset temperature of the copper component, thus providing the silicone resin 64 in the network form, which fills the gaps between the copper particles 63. As a result, the first underlying electrode 61A and the second underlying electrode 62A are formed as described above. Further, as described above, the curing onset temperature of the silicon component is higher than the sintering onset temperature of the copper component, thus providing the silicone resin 64, which serves as a dense film that fills the gaps between the copper particles 63. As a result, the proportion of the voids PA in the first underlying electrode 61A and the second underlying electrode 62A is decreased. Setting the curing onset temperature of the silicon component and the sintering onset temperature of the copper component to have such a magnitude relationship allow the proportion of the voids PA to be reduced.

Next, the plating step S15 is performed. Parts of the first underlying electrode 61A and second underlying electrode 62A are subjected to electroplating. Thus, the first metal layer 61B is formed on the surface of the first underlying electrode 61A. In addition, the second metal layer 62B is formed on the surface of the second underlying electrode 62A. Although not illustrated, the first metal layer 61B and the second metal layer 62B each have a two-layer structure with two kinds of nickel and tin electroplated. In this manner, the electronic component 10 is formed.

As for Sintering Onset Temperature of Copper Component and Curing Onset Temperature of Silicon Component The sintering onset temperature of the copper component was measured as follows. First, a complex ink including the copper component is prepared. Then, the change in the weight of the complex ink in firing was measured with the use of a thermal analyzer (Thermo Plus EVO2 manufactured by Rigaku).

The ratio of the decrease in weight in the case of setting the temperature to 600 degrees to the weight of the unsintered complex ink is defined as a weight decrease ratio of 100%. Further, the temperature at which the weight decrease ratio from the sintering onset is 99% is defined as the sintering onset temperature. For example, when the decrease from the weight of the unsintered ink is 10 mg in the case of setting the temperature to 600 degrees, the temperature at which the decrease in weight is 9.9 mg, that is, the weight decrease ratio is 99% is defined as the sintering onset temperature.

Figure 7:
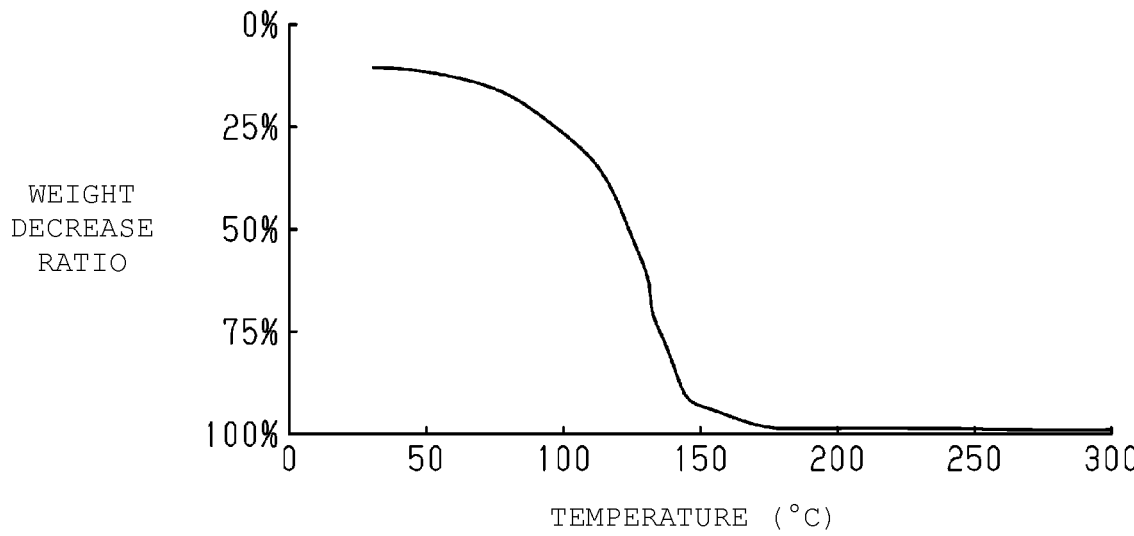
FIG. 7 is a graph showing a relationship between a weight decrease ratio and a temperature in the case of firing a test target.

Specifically, with the complex ink as a test target, the sintering onset temperature of the copper component was measured under the following conditions. The temperature at the start of the test was set to 40 degrees. The temperature rising rate was set to 10 degrees/min. The temperature at the end of the test was set to 600 degrees. As shown in FIG. 7, it was when the temperature was 170 degrees that the decrease in weight corresponding to 99% was reached in the case of normalizing the decrease in weight at 600 degrees as 100%. More specifically, the sintering onset temperature of the copper component is 170 degrees.

In addition, the curing temperature of the silicon component was measured as follows. In a measurement test, a silicon paste stretched was used as a test target. Further, in the measurement test, the test target was subjected to firing. In this case, the test was performed while changing the maximum value of the firing temperature by 10 degrees. The fired test target was touched with a finger, and the temperature at which the tackiness seemed to be lost was defined as the curing onset temperature. The tackiness was evaluated based on JIS K 5600-1-1 4.3.5 (c. The dry-to-touch state with no trace on the coated surface in the evaluation based on the JIS is regarded as a state without tackiness in the present embodiment. Specifically, the test target for test mentioned above is a silicone resin of 500 μm in thickness put on a glass slide with a squeegee. In the test, first, the test target was placed on a hot plate, and the test piece was heated at 150 degrees for 10 minutes. Thereafter, the test target piece was evaluated based on the JIS. Thereafter, the test target was heated for 10 minutes at the heating temperature increased by 10 degrees, and then, the evaluation based on the JIS was performed again. As described above, every time the heating temperature of the test piece was increased by 10 degrees, the evaluation based on the JIS was performed, and the temperature at which the tackiness seemed to be lost was defined as the curing onset temperature of the silicon component. Further, the measurement was performed in the atmosphere. According to the present embodiment, the curing onset temperature of silicon was shown to be 250 degrees in this test.

As for Observation Test

Prepared were the following electronic component according to Examples 1 to 12 and electronic components according to Comparative Examples 1 to 4. Then, the first underlying electrodes of the electronic components according to the examples and the comparative examples were observed. It is to be noted that the electronic components according to Examples 1 to 12 and the electronic component according to Comparative Example 1 to 4 have the same configurations for the base bodies, each of the internal electrodes, the first metal layers, and the like.

As for Examples 1 to 12 and Comparative Examples 1 to 4

The electronic components according to Examples 1 to 12 and Comparative Examples 1 to 4 will be described below.

In the electronic component according to Example 1, the proportion of voids in the first underlying electrode is 1%. In the electronic component according to Example 1, the average value for the thickness H in the first underlying electrode is 550 nm. In the electronic component according to Example 1, the flattening ratio of the copper particles is 0.2.

In the electronic component according to Example 2, the proportion of voids in the first underlying electrode is 1%. In the electronic component according to Example 2, the average value for the thickness H in the first underlying electrode is 550 nm. In the electronic component according to Example 2, the flattening ratio of the copper particles is 0.4.

In the electronic component according to Example 3, the proportion of voids in the first underlying electrode is 3%.

In the electronic component according to Example 3, the average value for the thickness H in the first underlying electrode is 500 nm. In the electronic component according to Example 3, the flattening ratio of the copper particles is 0.5.

In the electronic component according to Example 4, the proportion of voids in the first underlying electrode is 1%. In the electronic component according to Example 4, the average value for the thickness H in the first underlying electrode is 750 nm. In the electronic component according to Example 4, the flattening ratio of the copper particles is 0.2.

In the electronic component according to Example 5, the proportion of voids in the first underlying electrode is 3%. In the electronic component according to Example 5, the average value for the thickness H in the first underlying electrode is 800 nm. In the electronic component according to Example 5, the flattening ratio of the copper particles is 0.4.

In the electronic component according to Example 6, the proportion of voids in the first underlying electrode is 3%. In the electronic component according to Example 6, the average value for the thickness H in the first underlying electrode is 750 nm. In the electronic component according to Example 6, the flattening ratio of the copper particles is 0.5.

In the electronic component according to Example 7, the proportion of voids in the first underlying electrode is 2%. In the electronic component according to Example 7, the average value for the thickness H in the first underlying electrode is 1200 nm. In the electronic component according to Example 7, the flattening ratio of the copper particles is 0.2.

In the electronic component according to Example 8, the proportion of voids in the first underlying electrode is 3%. In the electronic component according to Example 8, the average value for the thickness H in the first underlying electrode is 1100 nm. In the electronic component according to Example 8, the flattening ratio of the copper particles is 0.4.

In the electronic component according to Example 9, the proportion of voids in the first underlying electrode is 4%. In the electronic component according to Example 9, the average value for the thickness H in the first underlying electrode is 1300 nm. In the electronic component according to Example 9, the flattening ratio of the copper particles is 0.5.

In the electronic component according to Example 10, the proportion of voids in the first underlying electrode is 3%. In the electronic component according to Example 10, the average value for the thickness H in the first underlying electrode is 1800 nm. In the electronic component according to Example 10, the flattening ratio of the copper particles is 0.2.

In the electronic component according to Example 11, the proportion of voids in the first underlying electrode is 4%. In the electronic component according to Example 11, the average value for the thickness H in the first underlying electrode is 1950 nm. In the electronic component according to Example 11, the flattening ratio of the copper particles is 0.4.

In the electronic component according to Example 12, the proportion of voids in the first underlying electrode is 4%. In the electronic component according to Example 12, the average value for the thickness H in the first underlying electrode is 2000 nm. In the electronic component according to Example 12, the flattening ratio of the copper particles is 0.5.

In the electronic component according to Comparative Example 1, the proportion of voids in the first underlying electrode is 3%. In the electronic component according to Comparative Example 1, the average value for the thickness H in the first underlying electrode is 350 nm. In the electronic component according to Comparative Example 1, the flattening ratio of the copper particles is 0.2.

In the electronic component according to Comparative Example 2, the proportion of voids in the first underlying electrode is 5%. In the electronic component according to Comparative Example 2, the average value for the thickness H in the first underlying electrode is 750 nm. In the electronic component according to Comparative Example 2, the flattening ratio of the copper particles is 0.6.

In the electronic component according to Comparative Example 3, the proportion of voids in the first underlying electrode is 8%. In the electronic component according to Comparative Example 3, the average value for the thickness H in the first underlying electrode is 750 nm. In the electronic component according to Comparative Example 3, the flattening ratio of the copper particles is 0.7.

In the electronic component according to Comparative Example 4, the proportion of voids in the first underlying electrode is 4%. In the electronic component according to Comparative Example 4, the average value for the thickness H in the first underlying electrode is 2200 nm. In the electronic component according to Comparative Example 4, the flattening ratio of the copper particles is 0.3.

As for Result of Observation Test

The results of the observation test on the electronic components according to Examples 1 to 12 and Comparative Examples 1 to 4 will be described below.

For the first underlying electrodes, the appearances were subjected to the observation test. In the test, first, the first underlying electrode was observed from the side close to the first end surface of the base body with the use of an optical microscope. Then, the presence or absence of any crack and the presence or absence of any film breakage in the first underlying electrode was determined. It was determined that a film breakage was caused when the first underlying electrode failed to cover the whole surface of the first end surface. It is to be noted that the appearance of the first underlying electrode was observed before the first metal layer was formed on the first underlying electrode.

In the electronic components according to Examples 1 to 12 and Comparative Examples 2 and 3, the appearances of the first underlying electrodes were found to have no problem observed. More specifically, the first underlying electrodes of the electronic components according to Examples 1 to 12 and Comparative Examples 2 and 3 were continuous films covering the whole surfaces of the first end surfaces of the base bodies. At the first underlying electrode of the electronic component according to Comparative Example 1, a film breakage was observed. In addition, at the first underlying electrode of the electronic component according to Comparative Example 4, a crack was observed.

From the observation results of Examples 1 to 12 and Comparative Example 1, it has been found that a film breakage is observed when the average value for the thickness of the first underlying electrode is smaller than 500 nm.

In other words, the average value for the thickness of the first underlying electrode can be considered preferably 500 nm or more.

In addition, from the observation results of Examples 1 to 12 and Comparative Example 4, it has been found that a crack is observed when the average value for the thickness of the first underlying electrode is larger than 2000 nm. In other words, the average value for the thickness of the first underlying electrode can be considered preferably 2000 nm or less.

Sections of the first underlying electrodes were subjected to the observation test. Specifically, whether any penetration of plating solution in the first underlying electrode was found or not was observed. First, sectional images of the first underlying electrode were photographed with a scanning electron microscope (SEM-EDX). Four different sections were subjected to the photographing at a magnification of 200,000 times or more. In each of the section, the penetration of plating solution was determined when a component of the first metal layer was detected at a position inside the outer surface of the first underlying electrode by a thickness of 10% or more of the average value for the thickness of the first underlying electrode 61A. It is to be noted that as for the determination, the penetration of plating solution was determined when the penetration of plating solution was found in one of the four sections observed.

In the first underlying electrodes according to Examples 1 to 12, the penetration of plating solution was not observed. In Comparative Examples 1 to 4, penetration of plating solution was observed. More specifically, from the observation results of Examples 1 to 12 and Comparative Example 1, it has been found that the plating solution penetrates into the first underlying electrode when the average value for the thickness of the first underlying electrode is smaller than 500 nm. In other words, the average value for the thickness of the first underlying electrode can be considered preferably 500 nm or more.

In addition, from the observation results of Examples 1 to 12 and Comparative Example 4, it has been found that the plating solution penetrates into the first underlying electrode when the average value for the thickness of the first underlying electrode is larger than 2000 nm. In other words, the average value for the thickness of the first underlying electrode can be considered preferably 2000 nm or less.

In addition, from the observation results of Examples 1 to 12 and Comparative Examples 2 and 3, it has found that the plating solution penetrates into the first underlying electrode when the flattening ratio of the copper particles is higher than 0.5. In other words, the flattening ratio of the copper particles con be considered preferably 0.5 or less.

In addition, from the observation results of Examples 1 to 12 and Comparative Examples 2 and 3, it has found that the plating solution penetrates into the first underlying electrode when the porosity of the first underlying electrode is 5% or more. In other words, the porosity of the first underlying electrode can be considered preferably less than 5%.

Advantageous Effects of Present Embodiment

The advantageous effects of the present embodiment will be described. While the advantageous effects of the first underlying electrode 61A will be representatively described below, the second underlying electrode 62A also produces the same advantageous effects.

(1) In the embodiment mentioned above, the silicone resin 64 is distributed without any gap around the copper particles 63. More specifically, the first underlying electrode 61A is a dense film that is high in density. Accordingly, in accordance with the configuration mentioned above, for example, a plating solution or the like for forming the first metal layer 61B can be kept from penetrating into the first underlying electrode 61A.

(2) The silicone resin 64 has higher adhesion to the other members than the copper particles 63. According to the embodiment mentioned above, the proportion of the silicone resin 64 in the first part 631 of the first underlying electrode 61A is higher than the proportion of the silicone resin 64 in the second part 632 of the first underlying electrode 61A. In other words, the silicone resin 64 is highly likely to be exposed to the inner surface 620 of the first underlying electrode 61A. Thus, the silicone resin 64 is likely to adhere to the base body 20, and the first underlying electrode 61A is unlikely to be peeled off from the base body 20.

(3) In the embodiment mentioned above, the average value for the thickness H of the first underlying electrode 61A is 700 nm. When the average value for the thickness H of the first underlying electrode 61A has this value, the stress generated at the time of sintering can be reduced. In addition, the average value for the thickness H of the first underlying electrode 61A falls within the range of 500 nm to 2000 nm. Accordingly, this configuration allows, from the results of the observation test, the first underlying electrode 61A to be kept from causing film breakages and cracks. Furthermore, this configuration can be considered highly effective in ability to keep a plating solution or the like for forming the first metal layer 61B from penetrating into the first underlying electrode 61A.

(4) In the embodiment mentioned above, the average value of the particle sizes of the copper particles 63 in the first part 631 of the first underlying electrode 61A is smaller than the average value of the particle sizes of the copper particles 63 in the second part 632 of the first underlying electrode 61A. More specifically, the copper particles 63, which are small in particle size, are likely to be densely packed on the inner surface 620. Thus, the electrical connection between the first underlying electrode 61A and the first internal electrodes 41 is likely to be reliable.

(5) In the embodiment mentioned above, the copper component is started to be sintered in the conductor paste before the silicon component is started to be cured therein in the curing step S14. As described above, due to this difference in onset temperature, the gaps between the copper particle components are filled with the silicon component. Utilizing such a difference in onset temperature facilitates the achievement of a structure in which silicon is distributed in a network form in the first underlying electrode 61A.

(6) As described above, in the curing step S14, the silicon component is distributed in the gaps between the copper components. Thus, sintering of the copper component is kept from proceeding. As a result, the particle sizes of the copper particles 63 to be formed are less likely to be increased. More specifically, the embodiment mentioned above is capable of suppressing the stress due to the copper particles 63 excessively increased at the time of sintering.

(7) The large difference between the sintering onset temperature of the copper component and the curing onset temperature of the silicon component may cause the copper components connected to each other into a film form before the silicon component is cured. When the copper component is connected into a film form as described above, the silicon component is less likely to be distributed in a network form. When the difference between the sintering onset temperature of the copper component and the curing onset temperature of the silicon component is about 80 degrees as in the embodiment mentioned above, the copper component can be prevented from being connected in a film form as described above.

Modification Examples

The above-mentioned embodiment and the following modification examples can be implemented in combination within a range that is not technically contradictory.

In the embodiment mentioned above, the electronic component 10 is not limited to any multilayer ceramic capacitor. For example, the electronic component 10 may be a piezoelectric component, a thermistor, an inductor, and the like including the base body 20, the first external electrode 61, and the second external electrode 62.

In the embodiment mentioned above, the material of the base body 20 may be a dielectric substance, a piezoelectric substance, a magnetic substance such as ferrite, a composite of a synthetic resin and a metal, or the like.

In the embodiment mentioned above, the conductor paste may be nano inks. In the case of nano inks, the inks are prepared as follows. Nanometal powders are dispersed in solvents containing cellosolves, carbitols, hydrocarbons, aromatics, and the like. Then, various silicone-modified resins, or silicone resins, sol-gel-based materials, or the like are added in an amount of 10-300 wt % with respect to the weight of Cu alone. The conductor pastes of the nano inks may be prepared in this manner, or by different methods.

In the embodiment mentioned above, the materials in the case of a complex ink for the conductor paste is not limited to the example of the embodiment mentioned above. For example, the amine compound may be any of primary amines, secondary amines, and tertiary amines, and furthermore, the number of N atoms is not limited. For example, the amine compound may be a primary amine such as an octylamine or a hexylamine, a secondary amine such as a di-n-butylamine, or a tertiary amine such as an N,N-dimethylhexylamine. In addition, the amine compound may be an alcoholamine, a diamine, or the like, and the positional relationship between the N atom and the OH group is not specified at the $\alpha$-, $\beta$-, $\gamma$-position, or the like. Furthermore, the numbers of N and O atoms in one molecule are also not particularly limited. For example, the amine compound may be an $\alpha$-hydroxylamine such as 2-dimethylaminoethanol or 2-ethylaminoethanol, or a $\beta$-hydroxylamine such as 3-amino-1-propanol or 4-amino-2-butanol. Furthermore, the amine compound may be a diamine such as an ethylenediamine, or a cyclic diamine such as piperazine. In addition, the silicon component may be, for example, various silicone-modified resins such as epoxy resins, polyester resins, and phenol resins, sol-gel materials, and the like. In addition, as the metal salt, metal salts obtained from formic acids, acetic acids, oxalic acids, other organic acids, and the like may be employed. Examples of this type of metal salt include a copper formate anhydride.

In the embodiment mentioned above, the numbers of the first internal electrodes 41 and the second internal electrodes 42 are not limited to the example of the embodiment mentioned above. The number of the first internal electrodes 41 may be less than or more than 4. In this respect, the same applies to the second internal electrodes 42.

In the embodiment mentioned above, the electronic component 10 may include a glass film. In such a case, for example, the glass film may be formed so as to cover the region of a part of the outer surface 21 of the base body 20. More specifically, the electrical connection between the first internal electrodes 41 and the first external electrode 61 and the electrical connection between the second internal electrodes 42 and the second external electrode 62 have only to be secured, if there is any glass film covering the base body 20.

In the embodiment mentioned above, the proportion of the silicone resin 64 in the first part 631 of the first underlying electrode 61A may be lower or equal to the proportion of the silicone resin 64 in the second part 632 of the first underlying electrode 61A. In this respect, the same applies to the second underlying electrode 62A.

In the embodiment mentioned above, the average value for the thickness H of the first underlying electrode 61A is not limited to the example of the embodiment mentioned above. In order to reduce the stress generated at the time of firing, the average value for the thickness H of the first underlying electrode 61A is preferably 500 nm to 2000 nm. In this respect, the same applies to the second underlying electrode 62A.

In the embodiment mentioned above, the average value of the particle sizes of the copper particles 63 in the first part 631 of the first underlying electrode 61A may be equal to or smaller than the average value of the particle sizes of the copper particles 63 in the second part 632 of the first underlying electrode 61A. In this respect, the same applies to the second underlying electrode 62A.

In the embodiment mentioned above, the silicon is not limited to the silicone resin 64. For example, the silicon may be silica (silicon dioxide) and the like.

In the embodiment mentioned above, the curing step S14 may be performed more than one time. More specifically, the firing may be performed more than one time.

In the embodiment mentioned above, the difference between the sintering onset temperature of the copper component of the conductor paste and the curing onset temperature of the silicon component thereof is not limited to the example of the embodiment mentioned above. In order to keep the copper component spherical, however, the difference between these onset temperatures is preferably 100 degrees or less.

In the embodiment mentioned above, the measurement of the curing onset temperature of the silicon component may be performed by different methods.

In the embodiment mentioned above, the measurement of the sintering onset temperature of the copper component may be performed by different methods. For example, first, a pellet of a nanopowder made of a copper component is prepared. Then, the shrinkage of the pellet in firing is measured with the use of a thermomechanical analyzer TMA (TA7000 manufactured by Hitachi High-Tech Science Corporation). Specifically, with a cylindrical pellet of 5 mm in diameter and 5 mm in height as a test target, and the height of the pellet in firing is measured. Then, the temperature at which the height is regarded as an inflection point in the two-dimensional graph of height and temperature is defined as the sintering onset temperature.

In the plating step S15 of the embodiment mentioned above, the first metal layer 61B may be formed by other methods such as sputtering. In this respect, the same applies to the second metal layer 62B.

In the embodiment mentioned above, the material of the first metal layer 61B is not limited to the example of the embodiment mentioned above. For example, the first metal layer 61B may be made of only nickel, or made of only tin, or may contain other materials. For example, the material of the first metal layer 61B may be copper, silver, gold, palladium, and the like. In this respect, the same applies to the second metal layer 62B.

In the embodiment mentioned above, the copper particles 63 may be an alloy containing a copper component. For example, the copper particles 63 may be an alloy of copper and a metal such as silver, gold, palladium, or nickel.

Technical ideas that can be derived from the embodiments and modification examples mentioned above will be described below.

[1] An electronic component including: a base body; and an external electrode that covers a part of an outer surface of the base body, the external electrode comprising: an underlying electrode containing copper and silicon; and a metal layer that covers an outer surface of the underlying electrode, wherein at least some of the copper has copper particles with a flattening ratio of 0.5 or less, and when the underlying electrode is viewed in section, the silicon is distributed so as to fill a gap between the copper particles.

[2] The electronic component according to [1], where when the underlying electrode is bisected into a first part located on a first side closer to the base body and a second part on a second side opposite to the base body, the proportion of the silicon in the first part is higher than the proportion of the silicon in the second part.

[3] The electronic component according to [1] or [2], where when the shortest distance from the surface on the first side closer to the base body opposite to the outer surface of the underlying electrode to the outer surface of the underlying electrode is defined as a thickness, the average value for the thickness of the underlying electrode is 500 nm to 2000 nm.

[4] The electronic component according to any one of [1] to [3], where when the underlying electrode is bisected into the first part located on the side closer to the base body and the second part on the side opposite to the base body, the average value of particle sizes of the copper particles in the first part is smaller than the average value of particle sizes of the copper particles in the second part.

[5] The electronic component according to any one of [1] to [4], where the silicon is a silicone resin.

[6] A method for manufacturing an electronic component, including: preparing a base body; applying a conductor paste containing a copper component and a silicon component to an outer surface of the base body; heating the base body with the conductor paste applied thereto to convert the conductor paste to an underlying electrode; and immersing the base body with the underlying electrode formed thereon in a plating solution to form a metal layer on the outer surface of the underlying electrode, where a curing onset temperature of the silicon component is higher than a sintering onset temperature of the copper component, and a difference between the curing onset temperature of the silicon component and the sintering onset temperature of the copper component is 100 degrees or less.

DESCRIPTION OF REFERENCE SYMBOLS

10: Electronic component
20: Base body
61: First external electrode
61A: First underlying electrode
61B: First metal layer
62: Second external electrode
62A: Second underlying electrode
62B: Second metal layer
63: Copper particle
64: Silicone resin
631: First part
632: Second part

The invention claimed is:

1. An electronic component comprising:
a base body; and
an external electrode that covers a part of an outer surface of the base body, the external electrode comprising:
an underlying electrode containing copper and silicon; and
a metal layer that covers an outer surface of the underlying electrode, wherein
at least some of the copper comprises copper particles with a flattening ratio of 0.5 or less, and
when the underlying electrode is viewed in section, the silicon is distributed to fill a gap between the copper particles.

2. The electronic component according to claim 1, wherein when the underlying electrode is bisected into a first part located on a first side closer to the base body and a second part on a second side opposite to the base body, a proportion of the silicon in the first part is higher than a proportion of the silicon in the second part.

3. The electronic component according to claim 2, wherein when a shortest distance from a surface on the first side closer to the base body opposite to the outer surface of the underlying electrode to the outer surface of the underlying electrode is defined as a thickness, an average value for the thickness of the underlying electrodes is 500 nm to 2000 nm.

4. The electronic component according to claim 2, wherein an average value of particle sizes of the copper particles in the first part is smaller than an average value of particle sizes of the copper particles in the second part.

5. The electronic component according to claim 1, wherein, when the underlying electrode is bisected into a first part located on a first side closer to the base body and a second part on a second side opposite to the base body, and when a shortest distance from a surface on the first side closer to the base body opposite to the outer surface of the underlying electrode to the outer surface of the underlying electrode is defined as a thickness, an average value for the thickness of the underlying electrodes is 500 nm to 2000 nm.

6. The electronic component according to claim 5, wherein an average value of particle sizes of the copper particles in the first part is smaller than an average value of particle sizes of the copper particles in the second part.

7. The electronic component according to claim 1, wherein when the underlying electrode is bisected into a first part located on a first side closer to the base body and a second part on a second side opposite to the base body, an average value of particle sizes of the copper particles in the first part is smaller than an average value of particle sizes of the copper particles in the second part.

8. The electronic component according to claim 1, wherein the silicon is a silicone resin.

9. The electronic component according to claim 1, wherein a ratio by weight of the copper to the silicon in the underlying electrode is 0.5 to 2.

10. A method for manufacturing an electronic component, the method comprising: preparing a base body; applying a conductor paste containing a copper component and a silicon component to an outer surface of the base body; heating the base body with the conductor paste applied thereto to convert the conductor paste to an underlying electrode; and immersing the base body with the underlying electrode formed thereon in a plating solution to form a metal layer on an outer surface of the underlying electrode, wherein a curing onset temperature of the silicon component is higher than a sintering onset temperature of the copper component, and a difference between the curing onset temperature of the silicon component and the sintering onset temperature of the copper component is 100 degrees or less, wherein at least some of the copper comprises copper particles with a flattening ratio of 0.5 or less, and when the underlying electrode is viewed in section, the silicon is distributed to fill a gap between the copper particles.

11. The method for manufacturing an electronic component according to claim 10, wherein when the underlying electrode is bisected into a first part located on a first side closer to the base body and a second part on a second side opposite to the base body, a proportion of the silicon in the first part is higher than a proportion of the silicon in the second part.

12. The method for manufacturing an electronic component according to claim 11, wherein when a shortest distance from a surface on the first side closer to the base body opposite to the outer surface of the underlying electrode to the outer surface of the underlying electrode is defined as a thickness, an average value for the thickness of the underlying electrodes is 500 nm to 2000 nm.

13. The method for manufacturing an electronic component according to claim 11, wherein an average value of particle sizes of the copper particles in the first part is smaller than an average value of particle sizes of the copper particles in the second part.

14. The method for manufacturing an electronic component according to claim 10, wherein, when the underlying electrode is bisected into a first part located on a first side closer to the base body and a second part on a second side opposite to the base body, and when a shortest distance from a surface on the first side closer to the base body opposite to the outer surface of the underlying electrode to the outer surface of the underlying electrode is defined as a thickness, an average value for the thickness of the underlying electrodes is 500 nm to 2000 nm.

15. The method for manufacturing an electronic component according to claim 14, wherein an average value of particle sizes of the copper particles in the first part is smaller than an average value of particle sizes of the copper particles in the second part.

16. The method for manufacturing an electronic component according to claim 10, wherein when the underlying electrode is bisected into a first part located on a first side closer to the base body and a second part on a second side opposite to the base body, an average value of particle sizes of the copper particles in the first part is smaller than an average value of particle sizes of the copper particles in the second part.

17. The method for manufacturing an electronic component according to claim 10, wherein the silicon is a silicone resin.

18. The method for manufacturing an electronic component according to claim 10, wherein a ratio by weight of the copper to the silicon in the underlying electrode is 0.5 to 2.

* * * * *